United States Patent
Stein et al.

(10) Patent No.: US 9,046,098 B2
(45) Date of Patent: Jun. 2, 2015

(54) FACE SEALING ANNULAR VALVE FOR A FLUID-WORKING MACHINE

(75) Inventors: Uwe Stein, Lothian (GB); Jens Eilers, Lothian (GB); Gordon Voller, Lothian (GB)

(73) Assignee: ARTEMIS INTELLIGENT POWER LIMITED, Midlothian (GB)

(*) Notice: Subject to any disclaimer, the term of this patent is extended or adjusted under 35 U.S.C. 154(b) by 474 days.

(21) Appl. No.: 13/390,909

(22) PCT Filed: Aug. 3, 2011

(86) PCT No.: PCT/JP2011/004412
§ 371 (c)(1),
(2), (4) Date: Apr. 17, 2012

(87) PCT Pub. No.: WO2013/018145
PCT Pub. Date: Feb. 7, 2013

(65) Prior Publication Data
US 2013/0032747 A1 Feb. 7, 2013

(51) Int. Cl.
*F16K 15/08* (2006.01)
*F04B 53/10* (2006.01)
*F16K 15/14* (2006.01)

(52) U.S. Cl.
CPC ............... *F04B 53/10* (2013.01); *F16K 15/08* (2013.01); *F16K 15/142* (2013.01)

(58) Field of Classification Search
CPC ....... F16K 25/00; F16K 15/08; F16K 15/142; F04B 53/10
USPC ................. 137/511–512, 528, 843, 847, 860, 137/614.2, 512.1, 512.5; 251/84–86, 284, 251/332–334, 902
See application file for complete search history.

(56) References Cited

U.S. PATENT DOCUMENTS 2,114,789 A * 4/1938 Urquhart ................. 251/333
3,076,630 A * 2/1963 Hammond ................ 251/43

(Continued)

FOREIGN PATENT DOCUMENTS

BE          372 655       9/1930
DE     10 2009 008692 A1  8/2010

(Continued)

OTHER PUBLICATIONS

PCT, "International Preliminary Report on Patentability for PCT/JP2011/004412", Feb. 13, 2014.

(Continued)

*Primary Examiner* — John Bastianelli
(74) *Attorney, Agent, or Firm* — Kanesaka, Berner & Partners

(57) ABSTRACT

A face sealing annular valve (1) for a fluid-working machine has an annular valve member (10, 50, 60, 70, 80, 90, 100, 110) having a relaxed configuration in which a first seat-engaging surface (14, 101) of the annular valve member can sealedly engage with a first sealing surface of an annular valve seat (8), but a second seat-engaging surface (15, 101) cannot sealedly engage with a second sealing surface (9), and is elastically deformable to a deformed configuration in which the second seat-engaging surface can sealedly engage with a second sealing surface, while the first seat-engaging surface remains sealedly engaged with the first sealing surface. The annular valve member can be made with relatively high tolerances and is only loosely retained by a guide in the relaxed configuration.

20 Claims, 7 Drawing Sheets

(56) References Cited

U.S. PATENT DOCUMENTS

| | | | |
|---|---|---|---|
| 3,594,824 A | 7/1971 | Nakib | |
| 4,986,246 A * | 1/1991 | Kessler de Vivie et al. | 251/129.21 |
| 5,161,571 A | 11/1992 | Nakazawa et al. | |
| 5,230,363 A | 7/1993 | Winn, Jr. et al. | |
| 5,901,761 A * | 5/1999 | Rutter et al. | 251/149.6 |
| 5,996,966 A * | 12/1999 | Zimmerly | 251/333 |
| 7,077,378 B2 | 7/2006 | Rampen et al. | |
| 7,174,882 B2 * | 2/2007 | Hezel et al. | 251/331 |
| 2011/0020159 A1 | 1/2011 | Kuttler et al. | |

FOREIGN PATENT DOCUMENTS

| | | | |
|---|---|---|---|
| DE | 20 2010 010935 U1 | 10/2010 | |
| GB | 2398112 A | 8/2004 | |
| JP | S55-135275 A | 10/1980 | |
| JP | S61-124785 A | 6/1986 | |
| JP | H06-94140 A | 4/1994 | |

OTHER PUBLICATIONS

PCT, "International Search Report and Written Opinion of the International Searching Authority for PCT/JP2011/004412", Feb. 13, 2014.

China Patent Office, "Office Action for CN201180034217.9," Jan. 6, 2014.

Japan Patent Office, "Decision to grant a patent for JP 2012-508704," Dec. 5, 2014.

* cited by examiner

FACE SEALING ANNULAR VALVE FOR A FLUID-WORKING MACHINE

RELATED APPLICATIONS

The present application is National Phase of International Application No. PCT/JP2011/004412 filed Aug. 3, 2011.

TECHNICAL FIELD

The invention relates to the field of face sealing annular valves suitable for use in fluid-working machines, such as hydraulic pumps, hydraulic motors and hydraulic pump-motors.

BACKGROUND ART

It is known to use face sealing annular valves to regulate the flow of hydraulic fluid into or out of a piston cylinder, or other working chamber of a fluid-working machine. In annular valves of this type, a ring-shaped fluid path is selectively sealed by a similarly ring-shaped annular valve member. Annular valves are advantageous as they can provide a relatively large cross-sectional area through which hydraulic fluid can flow into or out of a working chamber.

It is desirable for face sealing annular valves to be relatively small, in order to reduce the diameter of, the annular valve and therefore the size of fluid-working machine. It is also desirable for annular valves to be formed from as few parts as possible, and with as large tolerances as possible, while still fulfilling appropriate application-specific performance criteria, such as operating lifetime.

A problem which arises with known annular valve members is the difficulty of forming good inner and outer sealing lines in order to create an effective seal. The tolerance required for the valve seats and annular valve member are very small. If one of the inner sealing line or outer sealing line is formed before the other, then in known valves, the other sealing line will not be complete and sealing will be poor. Therefore, the invention addresses the technical problem of providing annular valves which reliably form seals.

Generally, in known valves in which inner and outer sealing lines form at the same time, the inner and outer sealing lines, between the annular valve member and the valve seat must be in a plane perpendicular to the axis of movement of the annular valve member to avoid one sealing line forming before the other. However, it can be desirable to have inner and outer sealing lines which are not in a plane perpendicular to the axis of movement of the annular valve member, for example, to reduce the size of the valve or to simplify the provision of flow passages through the valve. Thus, some embodiments of the invention particularly address the problem of forming an effective seal in embodiments where the inner and outer sealing lines are not in a plane perpendicular to the axis of movement of the annular valve member.

SUMMARY OF INVENTION

According to a first aspect of the invention there is provided a face sealing annular valve for a fluid-working machine, the valve having a valve body and an annular valve seat, the valve seat comprising a first annular sealing surface having a first circumference, a second annular sealing surface having a second circumference which is different from the first circumference, and which is coaxial with the first sealing surface, and at least one aperture between the first and second sealing surfaces providing a fluid pathway through the body of the valve;

and an annular valve member at least part of which is elastically deformable having a first annular seat-engaging surface configured to cooperate with the first annular sealing surface, and a second seat-engaging surface;

characterised in that the annular valve member has a relaxed configuration in which the first seat-engaging surface is sized to sealedly engage with the first sealing surface and in which the second seat-engaging surface is disposed in relation to the first seat-engaging surface such that the second sealing surface and the second seat-engaging surface do not sealedly engage when the first sealing surface and the first seat-engaging surface are in sealing engagement; and the at least part of the annular valve member is elastically deformable to a deformed configuration in which the second sealing surface and the second seat-engaging surface are in sealing engagement while the first sealing surface and the first seat-engaging surface are in sealing engagement, thereby restricting flow of fluid through the fluid pathway.

Thus the annular valve member, at least part of which is elastically deformable, is adapted to sealedly engage with the annular valve seat to thereby close the annular valve by elastic deformation, and need not be manufactured to tight manufacturing tolerances so as to precisely determine the relative positions of the first and second sealing surfaces in relation to one another, in order to sealedly engage with the annular valve seat. The annular valve member is resilient and therefore returns to the relaxed configuration when no external forces are applied.

The invention extends in a second aspect to an annular valve member for an annular valve according to the first aspect, the annular valve member having a first annular seat-engaging surface and a second seat-engaging surface, and wherein at least part of the annular valve member is elastically deformable between a relaxed configuration and a deformed configuration in which the relative positions of the first and second seat engaging surfaces differs from their relative positions in the relaxed configuration. Thus, in use in an annular valve according to the first aspect, the annular valve member has a relaxed configuration in which the first seat-engaging surface is sized to sealedly engage with the first sealing surface and in which the second seat-engaging surface is disposed in relation to the first seat-engaging surface such that the second sealing surface and the second seat-engaging surface do not sealedly engage when the first sealing surface and the first seat-engaging surface are in sealing engagement; and at least part of the annular valve member is elastically deformable to a deformed configuration in which the second sealing surface and the second seat-engaging surface are in sealing engagement while the first sealing surface and the first seat-engaging surface are in sealing engagement, thereby restricting flow of fluid through the fluid pathway.

By the circumference of a sealing surface or a seat-engaging surface (or other feature of the annular valve, we mean the length of the said surface or feature extending around a central axis of the annular valve, or the annular valve member, as the case may be. Thus the circumference may be an internal circumference or an external circumference of an internal or external surface (or other) feature. The circumference may be of a feature, such as a surface feature, having any orientation in relation to the respective axis.

The annular valve preferably comprises at least one conduit extending radially through the body from a said aperture. In some embodiments, the annular valve comprises a plurality of conduits extending radially through the body from each of a plurality of apertures. In some embodiments, the said conduits extend orthogonally to a plane including the said sealing surfaces. In some embodiments, the said conduits extend at an angle to a plane parallel to the said sealing surfaces. The said conduits may extend towards a central axis, about which the annular valve seat is disposed. In some embodiments, the said conduits extend towards the central axis at an angle other than 90 degrees to the central axis.

By annular valve, or valve member, or other annular feature of the invention we mean that the valve (or valve member other feature) is of generally annular configuration, and may be annular or may comprise structures which are non-annular, but which are disposed in a generally annular arrangement (for example a plurality of apertures arranged around an axis).

The annular valve member may be positionable generally around the annular valve seat, or generally within or against the annular valve seat, so as to sealedly engage therewith.

In some embodiments, the first seat-engaging surface is sealedly engageable with the first sealing surface by axial motion of the annular valve member, and the second seat-engaging surface is sealedly engageable with the second sealing surface by elastic deformation of at least part of the annular valve member from the relaxed configuration to the deformed configuration.

In some embodiments, the first and second sealing surfaces are axially spaced apart. Preferably, the first and second sealing surfaces are not both in a plane perpendicular to the axis of movement of the annular valve member. Preferably, the first and second sealing surfaces are not both in a plane perpendicular to a central axis, about which the annular valve seat is disposed.

In some embodiments, in the deformed configuration the second seat-engaging surface is elastically deformed so as to reduce, or increase, the circumference of the second seat-engaging surface in comparison to the relaxed configuration. The second seat-engaging surface may therefore be elastically deformable. The annular valve member typically comprises or consists of a resilient material (for example a resilient plastics material such as a PEEK (polyether ether ketone) plastics material) or steel, and in the deformed configuration, elastic deformation is present in the annular valve member as a whole. Typically, the degree of elastic deformation in the deformed configuration is different in different regions of the annular valve member. For example, the elastic deformation of, and in the region of, the second seat-engaging surface may be greater than the elastic deformation of other regions of the annular valve member. The greatest degree of elastic deformation may be at the second seat-engaging surface. In some embodiments the annular valve member comprises at least one rigid portion and at least one resilient portion.

In some embodiments, the first and second seat engaging surfaces are elastically deformable. Advantageously, in embodiments wherein one or both seat-engaging surfaces are elastically deformable, the annular valve member need not be composed of or comprise hardened materials, since the seat-engaging surfaces are adapted to elastically deform in order to sealedly engage with respective sealing surfaces and therefore do need not be manufactured to tight tolerances and of hardened materials in order to do so.

In embodiments wherein one or both of the said seat-engaging surfaces are elastically deformable, the effectiveness of the seal between the valve member and the valve seat is also less prone to degradation of the surfaces of the valve member and the valve seat, than known valve members, as the valve engaging surfaces are operable to conform to surface imperfections, or to deform around debris trapped between the sealing surfaces and the seat-engaging surfaces, and to come into sealing engagement with the valve seat.

In embodiments wherein the second seat-engaging surface is elastically deformable and the circumference of the second seat-engaging surface in the deformed configuration is different from the circumference of the second seat-engaging surface in the relaxed configuration, the elastic deformation between the relaxed and deformed configurations has a radial component. That is to say, the second seat-engaging surface (and typically a region of the annular valve member extending therefrom) may undergo deformation having a radial component (in relation to the central axis, and thus also to the axis of the first seat-engaging surface).

In some embodiments, the elastic deformation between the relaxed and deformed configurations, has an axial component. That is to say, the valve member may undergo elastic deformation resulting in (alternatively or in addition) a change in the axial distance between the first and second seat-engaging surfaces (and thus, axial motion of the second seat-engaging surface in relation to the valve body, in use).

Accordingly, in some embodiments, the second seat-engaging surface pivots around the first seat-engaging surface when the valve member moves from the relaxed to the deformed configuration, in use.

In some embodiments, the axial distance between the first and second seat-engaging surfaces is increased when the valve member is in the deformed configuration.

In embodiments where the first and second sealing surfaces are axially spaced apart, the axial distance between the first and second seat-engaging surfaces may be decreased when the valve member is in the deformed configuration.

The circumference of the first sealing surface may be greater than, or may be less than, the circumference of the second sealing surface.

In embodiments wherein the first circumference is greater than the second circumference, and the annular valve member is positionable generally around the annular valve seat, the axial distance between the first and second seat-engaging surfaces is decreased when the valve member is in the deformed configuration. In embodiments wherein the first circumference is smaller than the second circumference, and the annular valve member is positionable generally around the annular valve seat, the axial distance between the first and second seat-engaging surfaces is increased when the valve member is in the deformed configuration.

Typically, the annular valve member is retained by guide means comprising one or more cylindrically arranged guides, the one or more guides permitting axial motion and restricting radial motion of the annular valve member. The guide means is in fixed relationship relative to the annular valve seat and may be secured (directly or indirectly) to the annular valve seat, or the guide means and the annular valve seat may each be parts of a unitary construction (i.e. formed from a single piece of material). The guide means may consist of a cylindrical guide.

The annular valve member may be retained around the guide means, or may be retained within the guide means.

The annular valve member may be loosely retained by the guide means.

By loosely retained, we mean that the circumference (or diameter) of the guide means and the circumference extending around the corresponding surface or surfaces of the annular valve member (or the corresponding diameter of the annular valve member) differ by more than normal manufacturing tolerances. For example, the annular valve member may be retained around guide means (such as a cylindrical guide) and be provided with a guide engaging surface (or surfaces), the inner circumference of which is slightly larger than the circumference around the guide means (when the guide means is in a relaxed configuration). Typically, the circumferences or diameter of the guide means and the corresponding dimension or dimensions of the annular valve member (in a relaxed configuration) differ by at least 0.1%, in some embodiments at least 0.5%, and in some embodiments by at least 2%.

Thus, in use, the annular valve member is afforded a small amount of lateral motion (i.e. away from a central axis extending through the annular valve). An elastically deformable valve member, and in particular embodiments having elastically deformable second seat engaging surfaces, is advantageously able to deform so as to sealedly engage with the annular valve seat from any one of a range of positions in relation to the central axis, which range of positions are afforded by the loose fit around the guide means. The sealing engagement of known non-deformable valve members with respective annular valve seats, and in particular valve members for valves having a generally frustoconical valve seat (i.e. wherein the first and second sealing surfaces are axially spaced apart) are far less tolerant to axial misalignment of the valve member and the valve seat than the annular valve member of the present invention. Thus, the valve may be made to be less prone to being caused to jam open or closed, by debris trapped between the annular valve member and the guide means, than known annular valves.

Furthermore, as conventional annular valve members are sized to closely engage (within manufacturing tolerances) with guide means, such valve members are intolerant to tilting in relation to the guide means and the valve seat (i.e. in relation to an axis extending through the valve) and are typically provided with an extended "collar" (and thus extended guide means) in order to maintain alignment of the valve member. Such annular valve members must therefore have a comparatively high L/D ratio (typically in the range of 0.5-0.7), with concomitantly high mass, inertia and drag. By L/D we mean the ratio between the length of the valve member along its axis of symmetry and the diameter of the guide engaging formation (for example the internal diameter of an annular valve member of a valve having a cylindrical guide, around which the annular valve is slideably mounted).

Advantageously, the annular valve member of the present invention is also able to tilt, or skew, in relation to a central axis extending through the annular valve, to a greater degree than annular valve members of conventional face sealing annular valves, before opposite (in line through a central axis) surfaces engage with the guide means. The annular valve member is therefore more tolerant to jamming resulting from tilting and is thus able to be constructed having a far smaller L/D ratio (of less than 0.5, and in some embodiments in the region of 0.1, or less than 0.1). Consequently, the annular valve member is also lighter than those of known annular valves, and may therefore be operated more rapidly.

In some embodiments, the annular valve member is sealedly engageable with the cylindrical guide by virtue of a change in the circumference of at least a portion of the annular valve member, when the first and second sealing surfaces are in sealing engagement with the first and second seat-engaging surfaces.

In some embodiments, the second seat-engaging surface (and typically also a region of the valve member extending therefrom) is elastically deformable so as to sealedly engage with the cylindrical guide. Thus, the second sealing surface may be part of the cylindrical guide. Thus the second seat-engaging surface may function as, or comprise a part of, a guide-engaging surface.

Sealing engagement of the cylindrical guide (having the second sealing surface) and the second seat-engaging surface further improves the effectiveness of the seal between the valve member and the first sealing surface, and the provision of a valve member adapted to deform in this way ensures that the valve member is moveable and deformable to a final "closed" position in relation to the valve seat, irrespective of the relative positions of the (loosely retained) valve member and valve seat, when the first sealing and seat engaging surfaces initially sealedly engage.

Typically, the annular valve member comprises a guide-engaging surface. In some embodiments, the guide-engaging surface may be brought into sealing engagement with the cylindrical guide, by elastic deformation resulting in a change of the circumference of at least a part of the annular valve member (e.g. the guide-engaging surface, and/or in some embodiments, the first or the second seat engaging surface and typically also a region of the valve member extending therefrom).

At least a part of the guide-engaging surface may be thus provided with a tapered circumference, the circumference tapering with axial distance from the seat engaging surfaces. Thus, the average distance between the guide engaging surface and the guide means increases with axial distance from the guide-engaging surfaces.

In embodiments wherein the annular valve member is retained around the guide means, at least a part of the guide-engaging surface has a circumference which increases with axial distance from a minimum inner circumference of the valve member (which may be a said seat-engaging surface or a part of the guide engaging surface). Similarly, in embodiments wherein the annular valve means is retained within the guide means, at least part of the guide engaging surface has a circumference which decreases with axial distance from a maximum outer circumference.

A part (or all) of the guide-engaging surface may be frustoconical.

Preferably, the first seat-engaging surface and the guide-engaging surface each extend smoothly to a convex (in radial cross section) surface extending around the annular valve member. Thus the surface of a radial cross section of the annular valve member extends from the guide-engaging surface and the first seat-engaging surface to a convex surface. The convex surface may be a radiused surface. In some embodiments, some or all of the guide engaging surface is convex in radial cross section, and may be radiused, and may be an extension of the radiused surface.

In some embodiments, the annular valve member is elastically deformable between a relaxed configuration and a deformed configuration, responsive to a fluid pressure differential. I.e. a fluid pressure differential across the annular valve may be generated when the first sealing surface and first seat engaging surface are brought into sealing engagement, and the forces resulting from the differential fluid pressures on regions of the annular valve member may cause elastic deformation of the annular valve member.

It may be that the annular valve member comprises a resilient body and a rigid coating, wherein the resilient body is elastically deformable to enable the annular valve member to deform between the relaxed configuration and the deformed configuration although the rigid coating does not bend.

It may be that the annular valve member comprises a rigid body and sealing members formed of a resilient material, wherein the majority of the annular valve member does not deform elastically but the sealing members can deform sufficiently under pressure to enable both inner and outer seals to be formed.

It may be that the annular valve member is formed as a leaf spring (e.g. a steel leaf spring) which is curved in cross-section and is sufficiently thin to deform elastically.

It may be that the first and second sealing surfaces are formed as protrusions, for example, annular ridges. The protrusions may extend axially. The first sealing surface may protrude further in an axial direction than the second sealing surface so that the annular valve member can contact the first sealing surface but not the second sealing surface in the relaxed configuration. The annular valve member may have a flat annular valve seat facing surface in a plane perpendicular to the axis of the annular valve member.

The annular valve member may be resiliently biased towards the annular valve seat by resilient biasing means. In alternative embodiments, it may be that the annular valve member is resiliently biased away from the annular valve seat by resilient biasing means. I.e. the annular valve may be biased open by the resilient biasing means, or may be biased closed by the resilient biasing means.

It may be that the annular valve member is elastically deformable between a relaxed configuration and a deformed configuration under the action of resilient biasing means.

According to a third aspect of the invention, there is provided a method of operating a face sealing annular valve of a fluid-working machine, the valve having a valve body and an annular valve seat, the valve seat comprising a first annular sealing surface having a first circumference, a second annular sealing surface having a second circumference which is different from the first circumference, and which is coaxial with the first sealing surface, and at least one aperture between the first and second sealing surfaces providing a fluid pathway through the body of the valve;

and an elastically deformable annular valve member having a first annular seat-engaging surface configured to cooperate with the first annular sealing surface, and a second seat-engaging surface;

the method comprising bringing the first seat-engaging surface into sealing engagement with the first sealing surface; and characterised by elastically deforming the annular valve member so as to bring the second seat engaging surface into sealing engagement with the second sealing surface, to thereby restrict the flow of fluid through the fluid pathway.

The method may comprise elastically deforming the annular valve member so as to change the circumference of the second seat-engaging surface and thereby bring the second seat-engaging surface into sealing engagement with the second sealing surface.

The method may comprise elastically deforming the annular valve member so as to change the axial distance between the first and second seat-engaging surface and thereby bring the second seat-engaging surface into sealing engagement with the second sealing surface.

In some embodiments, the method comprises pivoting the second seat-engaging surface around the first seat-engaging surface to bring the second seat-engaging surface into sealing engagement with the second sealing surface.

The annular valve member may be loosely retained around a cylindrical guide, and the method may comprise elastically deforming the annular valve member so as to change the circumference of at least a portion of the annular valve member and bring the annular valve member into sealing engagement with the cylindrical guide, that the cylindrical guide comprises the second seat-engaging surface.

In some embodiments, the method comprises providing a fluid pressure differential across the annular valve member, so as to elastically deform the annular valve member (for example by moving the annular valve member axially in relation to the valve body so as to bring the first seat-engaging surface into sealing engagement with the first sealing surface, and to thereby obstruct flow of fluid through the or each said aperture and provide a pressure differential across the annular valve member).

The valve may comprise resilient biasing means to urge the annular valve member towards the annular valve seat, and the method may comprise elastically deforming the annular valve member by force from resilient biasing means.

Further preferred and optional features of the third aspect correspond to preferred and optional features of the first and second aspects.

BRIEF DESCRIPTION OF DRAWINGS

An example embodiment of the present invention will now be illustrated with reference to the following Figures in which.

DESCRIPTION OF EMBODIMENTS

Figure 1:
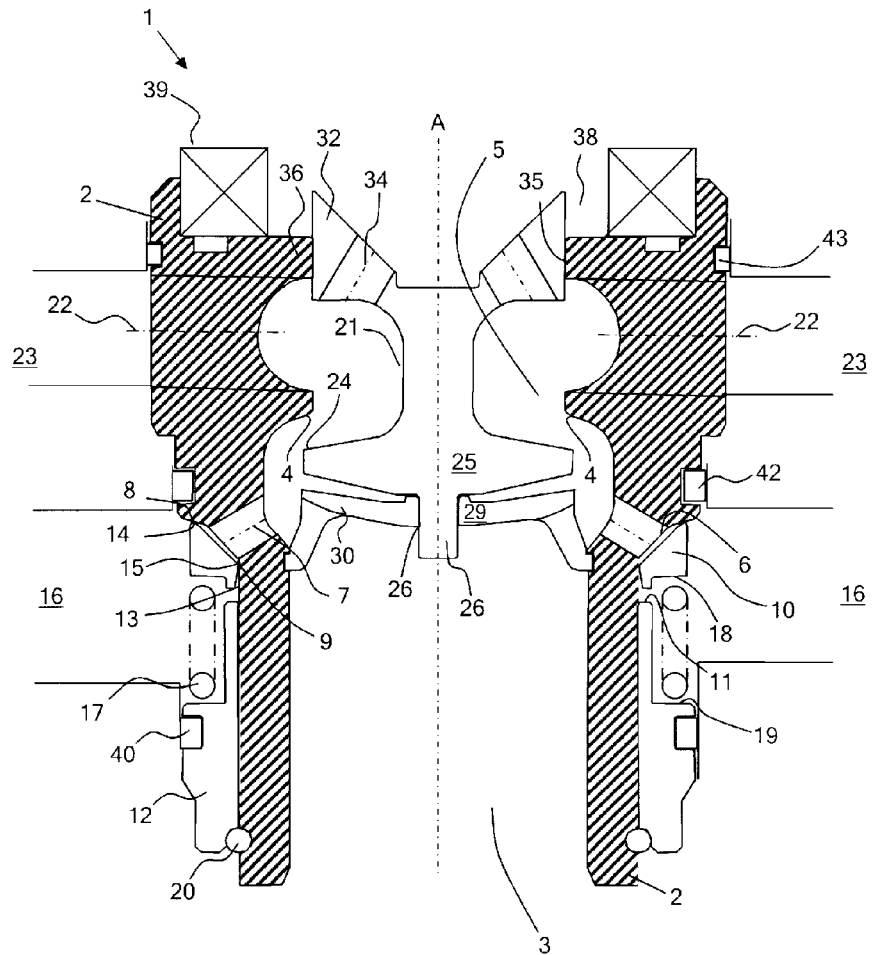
FIG. 1 is a cross sectional view of a cylinder assembly.

FIG. 1 shows a cylinder assembly 1 for use with a fluid-working machine, such as a hydraulic pump, a hydraulic motor or a hydraulic pump-motor. The cylinder assembly comprises a body 2 which is generally cylindrically symmetric around the cylinder axis A and comprises a cylinder 3 which is open to a first end of the body, a poppet valve seat 4 defining a poppet valve aperture 5 (providing a fluid pathway between the cylinder and radial passages 22 extending through an upper portion of the body), and an annular valve seat 6, defining a plurality of apertures 7 arrayed around and extending through the body. The annular valve seat comprises an outer sealing surface 8 (functioning as the first sealing surface) and an inner sealing surface 9 (functioning as the second sealing surface).

An annular valve member 10 is retained around the body between the annular valve seat and the end stop 11 of a collar 12. The annular valve member is threaded around the outer surface 13 of the cylinder, which functions as guide means for the annular valve member.

The annular valve member is formed of a resilient material, such as PEEK, and is therefore elastically deformable. The annular valve member comprises an outer seat-engaging surface 14 (functioning as the first seat-engaging surface) and an inner seat-engaging surface 15 (functioning as the second seat-engaging surface). The annular valve seat and the annular valve member together form an annular valve, which is shown in its closed position in FIG. 1. The annular valve regulates the flow of hydraulic fluid between a high pressure manifold 16 and the cylinder, by way of the apertures 7.

The annular valve member is biased towards the annular valve seat by coiled spring 17 (functioning as resilient biasing means) which extends between the lower face 18 of the annular valve member and an opposed upper face 19 of the collar. The collar is held in place by retaining ring 20. The collar may be provided with an interference fit around the cylinder for a part, or all, of the depth of the collar or the collar and cylinder body may be cooperatively engaged, for ease of installation and removal of the collar, annular high pressure valve and spring.

The assembly further comprises a poppet valve member 21 which, together with the poppet valve seat and poppet valve aperture, forms a poppet valve for controlling the flow of fluid between radial passages 22 (which are in fluid communication with a low pressure manifold 23) and the cylinder 5. The poppet valve member is operable to move along the axis A, such that the poppet valve may be moved between an open position (as shown) and a closed position where the sealing surface 24 (an annular region on an upper face of the head portion 25 of the poppet valve member) is in contact with the poppet valve seat.

The poppet valve member is provided at its lower end with a peg 26, which is in slideable engagement with a central aperture 27 in lower guide structure 29. The lower guide structure comprises and is held in place by radial struts 30 extending to the inner walls of the cylinder and, in use, functions to restrict movement of the peg away from the cylinder axis and to form a partial barrier to protect or isolate fluid flow between the cylinder and the low pressure manifold from the poppet, which would otherwise act to urge the poppet valve closed.

At its upper end, the poppet valve member is provided with an armature 32, comprising passages 34 extending between upper and lower faces of the armature, placing radial passages 22 in fluid communication with coil space 38 around which is located a solenoid coil 39, enabling the poppet valve to be electronically actuated by control signals from an electronic controller (not shown). The outer face of the armature is slidably engaged with the inner face 35 of upper guide structure 36. A first seal, 40, extends around a channel provided in the collar, and second and third seal 42, 43 extend around similar channels provided in the body, above the annular valve seat. The first and second seals prevent egress of pressurised hydraulic fluid from the high pressure manifold around the cylinder assembly during operation.

Figure 2:
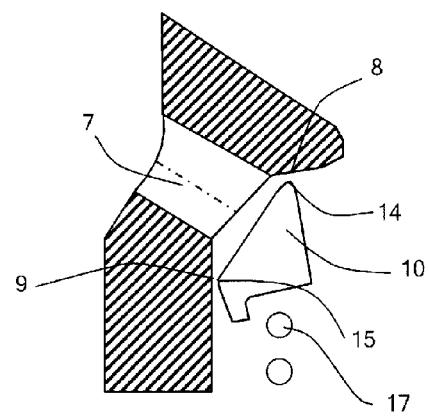
FIG. 2 is a cross sectional view through the annular valve seat and annular valve member, with the annular valve member in the relaxed configuration.
Figure 3:
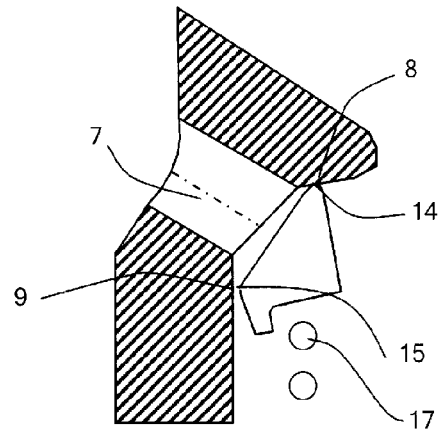
FIG. 3 is a cross sectional view through the annular valve seat and annular valve member, part way during closure of the annular valve.
Figure 4:
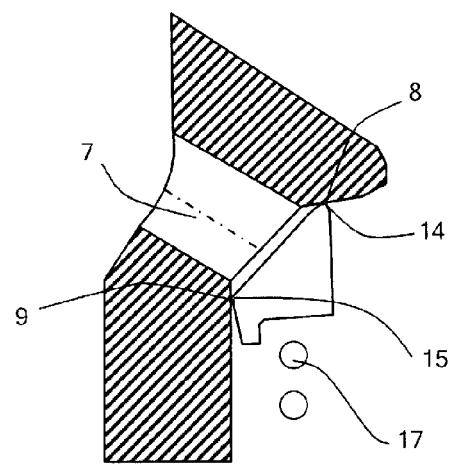
FIG. 4 is a cross sectional view through the annular valve seat and annular valve member, when the annular valve is closed, and the annular valve member is in the deformed configuration.

FIGS. 2 through 4 illustrate stages during the closing of the annular valve member. The procedure is reversed during subsequent opening. The annular valve is open when the pressure in the cylinder greater than the pressure in the high pressure manifold. In that case, the annular valve member adopts the relaxed configuration illustrated in FIG. 2.

The annular valve member is resiliently biased closed by the spring and, when the pressure differential between the high pressure manifold and the cylinder is sufficiently low, the annular valve member slides axially towards the annular valve seat so that the outer seat-engaging surface of the annular valve member contacts the outer sealing surface of the annular valve seat. As can be seen from FIG. 3, while it remains in the relaxed configuration, the shape of the annular valve member is such that the outer seat-engaging surface corresponds in shape with the outer sealing surface of the annular valve seat so that the outer seat-engaging surface of the annular valve member and the outer sealing surface of the annular valve seat can be brought into sealing engagement to form an outer seal. However, the inner seat-engaging surface has a greater diameter than the inner sealing surface and so, in the relaxed configuration, the inner seat-engaging surface is not sized so as to be able to sealingly engage with the inner sealing surface. The size of the gaps between the seat-engaging surfaces and the sealing surfaces has been exaggerated in the Figures for the purpose of illustration.

When there is sufficient pressure in the high pressure valve member, the annular valve member deforms elastically to the deformed configuration shown in FIG. 4. In the deformed configuration, the inner seat-engaging surface is sized to sealingly engage with the inner sealing surface. During this deformation, the resilient material from which the annular valve member is formed deforms elastically, and pivots around the outer seat-engaging surface. The radius of the inner seat-engaging surface changes (decreases) and the inner seat-engaging surface moves both radially inwards and axially, towards the apertures 7, and therefore face-seals against in the inner sealing surface.

When the pressure differential is reduced, the annular valve member returns to the relaxed configuration and slides axially away from the apertures, back to the position shown in FIG. 2.

Advantageously, the manufacturing tolerances required for the annular valve member are smaller than would be the case for an annular valve member which must form inner and outer seals simultaneously, and the lifetime may be greater as more wear can be tolerated.

In the relaxed configuration, the space between the inner seat-engaging surface and the outer surface of the cylinder means that the annular valve is loosely retained on the cylinder and can easily be slid axially while still being guided by the cylinder. However, there is a change (reduction) in the circumference of the inner seat-engaging surface during deformation from the relaxed configuration to the deformed configuration, which causes the inner seat-engaging surface to tightly grip the cylinder when the annular valve is sealed, facilitating provision of a good seal.

In order for the invention to function, it is only necessary for at least part of the annular valve member to be a resilient part which can deform elastically to enable the annular valve member to have both relaxed and deformed configurations.

Figure 5:
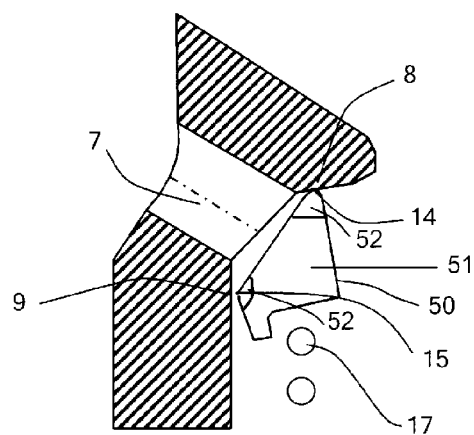
FIG. 5 is a cross sectional view through the annular valve seat and a second embodiment of an annular valve member, part way during closure of the annular valve, while the annular valve member remains in the relaxed configuration.
Figure 6:
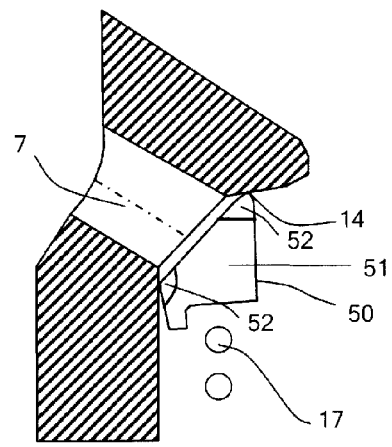
FIG. 6 is a cross sectional view through the annular valve seat and the second embodiment annular valve member 5, when the annular valve is closed, and the annular valve member is in the deformed configuration.

For example, with reference to FIGS. 5 and 6, a second embodiment of an annular valve member 50 has a resilient body 51 and a rigid coating 52, such as a graphite layer, at each of the first and second seat-engaging surfaces. The resilient body is elastically deformable to enable the annular valve member to deform between the relaxed configuration (FIG. 5) and deformed configuration (FIG. 6) although the rigid coating does not deform.

Figure 7:
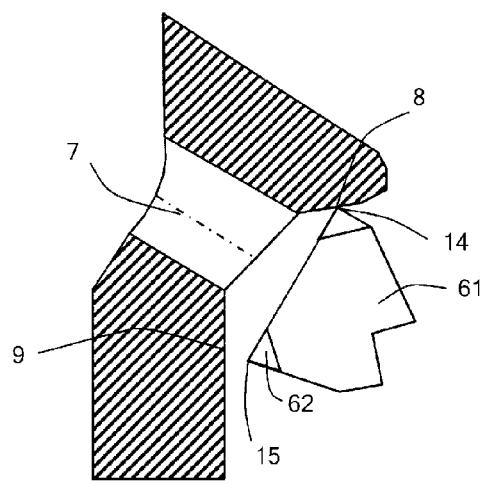
FIG. 7 is a cross sectional view through the annular valve seat and a third embodiment of an annular valve member, part way during closure of the annular valve, while the annular valve member remains in the relaxed configuration.
Figure 8:
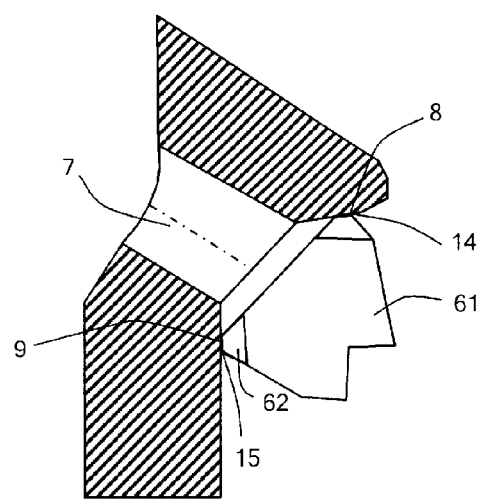
FIG. 8 is a cross sectional view through the annular valve seat and the third embodiment of the annular valve member, when the annular valve is closed, and the annular valve member is in the deformed configuration.

With reference to FIGS. 7 and 8, a third embodiment of an annular valve member 60 has a rigid body 61, formed of steel, and sealing members 62, formed of PEEK or another resilient material, which defines the outer and inner seat-engaging surfaces. Thus, although the majority of the annular valve member 60 does not deform elastically, it remains the case that in a relaxed configuration, the outer seat-engaging surface can form a seal with the outer sealing surface of the annular valve seat but the inner seat-engaging surface does not sealedly engage with the inner sealing surface of the annular valve seat. However, the sealing members can deform sufficiently under pressure to enable both inner and outer seals to be formed.

Figure 9:
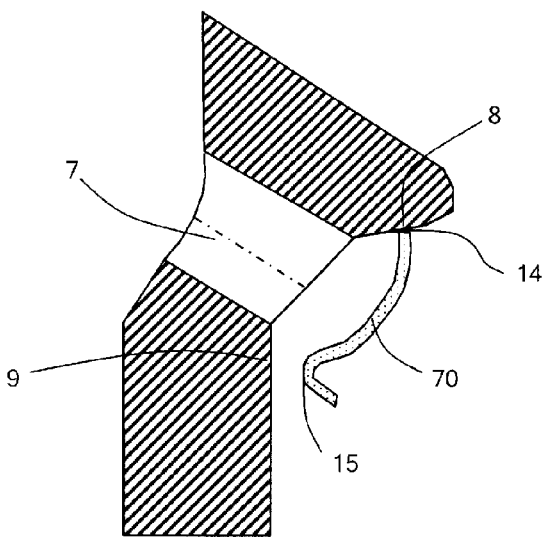
FIG. 9 is a cross sectional view through the annular valve seat and a fourth embodiment of an annular valve member, part way during closure of the annular valve, while the annular valve member remains in the relaxed configuration.
Figure 10:
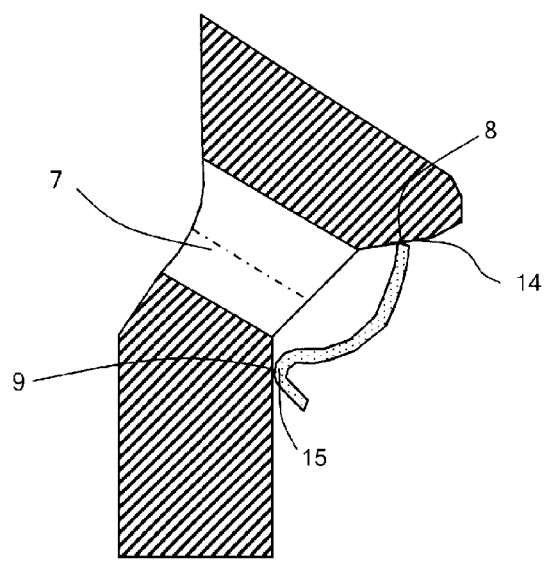
FIG. 10 is a cross sectional view through the annular valve seat and the fourth embodiment of the annular valve member, when the annular valve is closed, and the annular valve member is in the deformed configuration.

FIGS. 9 and 10 illustrate a fourth embodiment of an annular valve member 70 formed as a steel leaf spring which is curved in cross-section and is sufficiently thin to deform elastically. In a relaxed configuration shown in FIG. 8, the annular valve member has an outer portion 71 including an outer seat-engaging surface which can sealingly engage with the outer sealing surface of the annular valve seat, and an inner portion 72 which is too large for the inner seat-engaging surface to form a seal with the inner sealing surface. As before, the annular valve member is loosely retained around the outer surface of the cylinder in the relaxed configuration but fits tightly, forming a good seal, in the deformed configuration.

Figure 11:
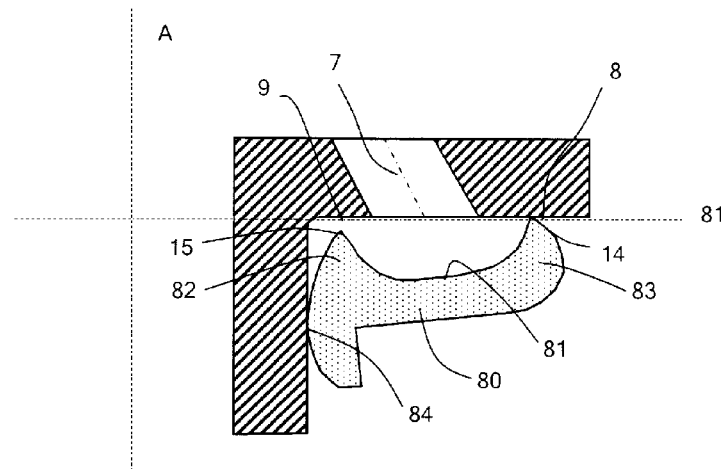
FIG. 11 is a cross sectional view through the annular valve seat and a fifth embodiment of an annular valve member, part way during closure of the annular valve, while the annular valve member remains in the relaxed configuration.
Figure 12:
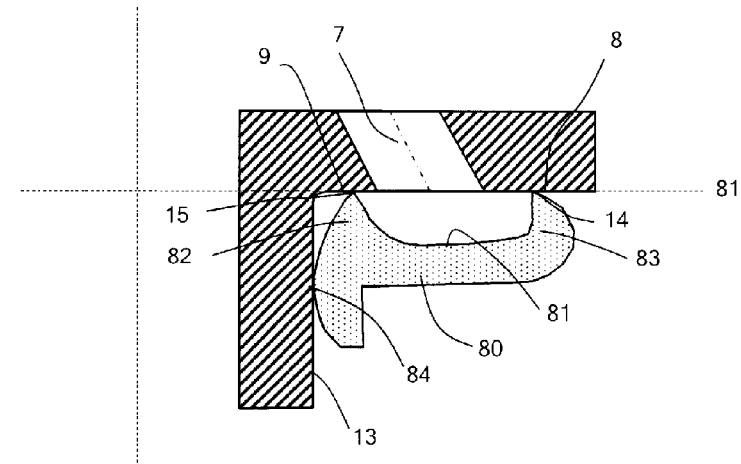
FIG. 12 is a cross sectional view through the annular valve seat and the fifth embodiment of the annular valve member, when the annular valve is closed, and the annular valve member is in the deformed configuration.

FIGS. 11 and 12 illustrate a fifth embodiment of an annular valve member 80 according to the invention. In the fifth embodiment, the annular valve member is formed from a resilient material, such as PEEK, and is suitable for sealing an annular valve in which the inner and outer sealing surfaces are in a plane perpendicular to the central axis A. The annular valve member has an upper surface 81 including inner and outer concentric ridges 82, 83 which form the inner and outer seal-engaging surfaces respectively. The outer concentric ridge extends slightly further axially than the inner concentric ridge. The annular valve member also has a convex guide contacting inward surface 84 which slides against the outer surface of the cylinder.

The annular valve member of the fifth embodiment has a relaxed configuration shown in FIG. 11 in which the outer seal-engaging surface contacts the outer sealing surface of the annular valve but, as the outer ridge extends slightly beyond the inner ridge, the inner seal-engaging surface does not contact the inner sealing surface.

When there is a sufficient pressure differential across the annular valve member, the annular valve member deforms elastically by flexing so that the inner ridge extends as far as the outer ridge and the inner seal-engaging surface makes sealing contact with the inner sealing surface while the outer seal-engaging surface makes sealing contact with the outer sealing surface.

Figure 13:
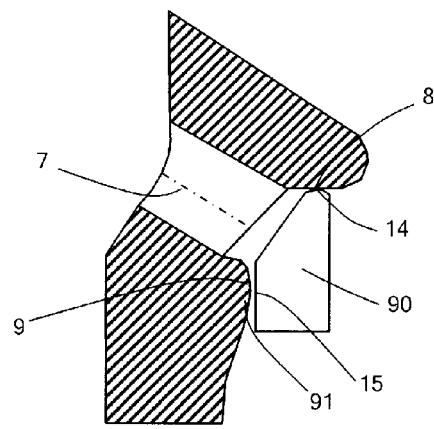
FIG. 13 is a cross sectional view through the annular valve seat and a sixth embodiment of an annular valve member, part way during closure of the annular valve, while the annular valve member remains in the relaxed configuration.
Figure 14:
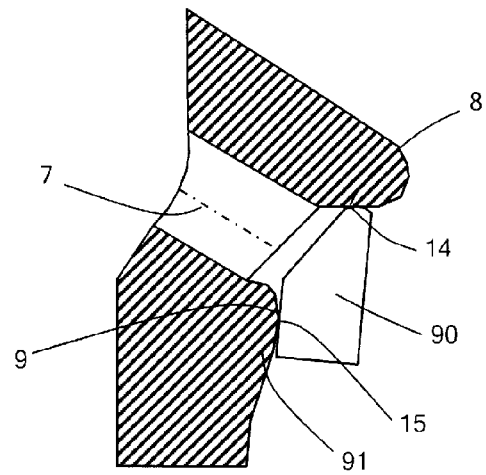
FIG. 14 is a cross sectional view through the annular valve seat and the sixth embodiment of the annular valve member, when the annular valve is closed, and the annular valve member is in the deformed configuration.

In contrast to the first five embodiments, in which the inner and outer seal-engaging surfaces of the annular valve member are rounded in cross-section, a sixth example embodiment of a resilient annular valve member 90, illustrated in FIGS. 13 and 14, has a cylindrical inner seal-engaging surface which is flat, or almost flat, in cross-section. Instead, the cylinder has a rounded peripheral protrusion 91 (functioning as the second sealing surface). The cylindrical inner seal-engaging surface has a slightly greater circumference than the peripheral protrusion in the relaxed state shown in FIG. 13. However, when the pressure in the high pressure manifold is sufficiently high relative to the pressure in the cylinder, the annular valve member deforms elastically around the outer seal-engaging surface so that the inner seal-engaging surface forms a seal against the rounded peripheral protrusion.

Figure 15:
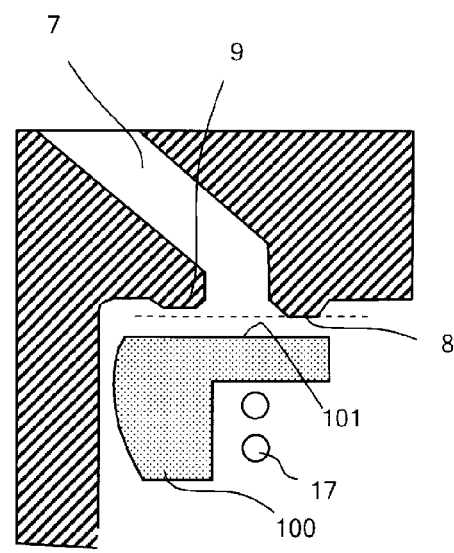
FIG. 15 is a cross sectional view through the annular valve seat and a seventh embodiment of an annular valve member, part way during closure of the annular valve, while the annular valve member remains in the relaxed configuration.
Figure 16:
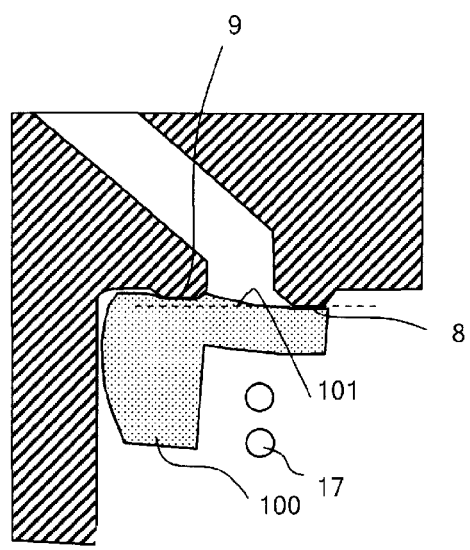
FIG. 16 is a cross sectional view through the annular valve seat and the seventh embodiment of the annular valve member, when the annular valve is closed, and the annular valve member is in the deformed configuration.

FIGS. 15 and 16 illustrate a seventh example embodiment of a resilient annular valve member 100 having a planar seal-engaging surface 101, in a plane perpendicular to the axis of the annular valve seat when the annular valve member is in the relaxed configuration shown in FIG. 15. The inner sealing surface 9 and sealing surface 8 are formed by protrusions, such as circular ridges and one of the sealing surfaces (in this example, the outer sealing surface) protrudes further from the annular valve seat. Thus, the planar seal-engaging surface can contact only the outer sealing surface when the annular valve member is in the relaxed configuration. In the deformed configuration illustrated in FIG. 16, the planar seal-engaging surface can contact both the inner and outer sealing surfaces, forming a seal. In this case, outer and inner regions of the planar seal-engaging surface 101 function as the first and second seat-engaging regions respectively of the annular valve member.

In the first through fourth embodiments, the outer seal-engaging surface is not perpendicular to the central axis of the cylinder assembly, but is sloped radially outwards away from the annular valve member. Thus, when the annular valve is closed, the force exerted on the outer seal-engaging surface by the outer sealing surface has a radially outwards component. Typically, the annular valve member is designed so that, during normal operation, the said radially outward force component approximately balances radially inwards forces on the outer seal-engaging surface arising from the pressure differential across the annular valve member.

The terms upper and lower, and other terms concerning orientation and direction, relate to the apparatus having the orientation shown in the figures and herein described, and are intended to describe the relative position of the respective integers regardless of the orientations of the apparatus in use.

The cylinder body and cylinder assembly of the invention is suitable for use in fluid working machines having any or a wide variety of piston types, for example pistons comprising piston rings, pistons which remain substantially aligned with the cylinder axis and/or pistons whose axis remains aligned with a rotating eccentric cam and thus not aligned with the cylinder axis; and piston driving means such as eccentric cams onto which the pistons or piston-engaging rings are urged by the action of springs or fluid pressure from within the working chamber, or eccentrics to which pistons are engagingly held.

Further variations and modifications can be made within the scope of the invention herein disclosed.

REFERENCE SIGNS LIST

1 Cylinder assembly
2 Body
3 Cylinder
4 Poppet valve seat
5 Poppet valve aperture
6 Annular valve seat
7 Apertures
8 Outer (first) sealing surface
9 Inner (second) sealing surface
10 Annular valve member
11 End stop
12 Collar
13 Outer surface of cylinder (guide means)
14 Outer (first) seat-engaging surface
15 Inner (second) seat-engaging surface
16 High pressure manifold
17 Spring
18 Lower face of annular valve member
19 Upper face of collar
20 Retaining ring
21 Poppet valve member
22 Radial passages
23 Low pressure manifold
24 Sealing surface
25 Head portion of poppet valve member
26 Peg
27 Central aperture
29 Lower guide structure
30 Radial struts
32 Armature
34 Passages
36 Upper guide structure
38 Coil space
39 Solenoid coil
40 Lower high pressure seal
42 Upper high pressure seal
43 Low pressure seal
50 Annular valve member (second embodiment)
51 Resilient body
52 Rigid coating
60 Annular valve member (third embodiment)
61 Rigid body
62 Sealing members
70 Annular valve member (fourth embodiment)
71 Outer portion
72 Inner portion
80 Annular valve member (fifth embodiment)
81 Upper surface
82 Inner ridge
83 Outer ridge
84 Inward surface
90 Annular valve member (sixth embodiment)
91 Peripheral protrusion
100 Annular valve member (seventh embodiment)
101 Seal engaging surface

The invention claimed is:

1. A method of operating a face sealing annular valve of a fluid-working machine, the valve having a valve body and an annular valve seat, the valve seat comprising a first annular sealing surface having a first circumference, a second annular sealing surface having a second circumference which is different from the first circumference, and which is coaxial with the first sealing surface, and at least one aperture between the first and second sealing surfaces providing a fluid pathway through the body of the valve; and an elastically deformable annular valve member having a first annular seat-engaging surface configured to cooperate with the first annular sealing surface, and a second seat-engaging surface, the annular valve member having a relaxed configuration in which the first seat-engaging surface is sized to sealedly engage with the first sealing surface and in which the second seat-engaging surface is disposed in relation to the first seat-engaging surface such that the second sealing surface and the second seat-engaging surface do not sealedly engage when the first sealing surface and the first seat-engaging surface are in sealing engagement;

the method comprising bringing the first seat-engaging surface into sealing engagement with the first sealing surface; elastically deforming the annular valve member from the relaxed configuration to a deformed configuration so as to bring the second seat engaging surface into sealing engagement with the second sealing surface, to thereby restrict the flow of fluid through the fluid pathway; and pivoting the second seat-engaging surface around the first seat-engaging surface to bring the second seat-engaging surface into sealing engagement with the second sealing surface when the annular valve member transits from the relaxed configuration to the deformed configuration.

2. The method according to claim 1, comprising elastically deforming the annular valve member so as to change an axial distance between the first and second seat-engaging surface and thereby bring the second seat-engaging surface into sealing engagement with the second sealing surface.

3. A face sealing annular valve for a fluid-working machine, the valve having a valve body and an annular valve seat, the valve seat comprising a first annular sealing surface having a first circumference, a second annular sealing surface having a second circumference which is different from the first circumference, and which is coaxial with the first sealing surface, and at least one aperture between the first and second sealing surfaces providing a fluid pathway through the body of the valve;

and an annular valve member at least part of which is elastically deformable having a first annular seat-engaging surface configured to cooperate with the first annular sealing surface, and a second seat-engaging surface;

wherein the annular valve member has a relaxed configuration in which the first seat-engaging surface is sized to sealedly engage with the first sealing surface and in which the second seat-engaging surface is disposed in relation to the first seat-engaging surface such that the second sealing surface and the second seat-engaging surface do not sealedly engage when the first sealing surface and the first seat-engaging surface are in sealing engagement; and at least part of the annular valve member is elastically deformable to a deformed configuration in which the second sealing surface and the second seat-engaging surface are in sealing engagement while the first sealing surface and the first seat-engaging surface are in sealing engagement, thereby restricting flow of fluid through the fluid pathway, and the annular valve member is at least partially deformable so that the second seat-engaging surface pivots around the first seat-engaging surface to bring the second seat-engaging surface into sealing engagement with the second sealing surface when the annular valve member transits from the relaxed configuration to the deformed configuration.

4. The face sealing annular valve according to claim 3, wherein the first and second sealing surfaces are axially spaced apart.

5. The face sealing annular valve according to claim 3, wherein the first seat-engaging surface is sealedly engageable with the first sealing surface by axial motion of the annular valve member, and the second seat-engaging surface is sealedly engageable with the second sealing surface by elastic deformation of the annular valve member.

6. The face sealing annular valve according to claim 5, wherein the second seat-engaging surface is elastically deformable and a circumference of the second seat-engaging surface in the deformed configuration is different from a circumference of the second seat-engaging surface in the relaxed configuration.

7. The face sealing annular valve according to claim 5, wherein an axial distance between the first seat-engaging surface and the second seat-engaging surface in the deformed configuration is different from an axial distance therebetween in the relaxed configuration.

8. The face sealing annular valve according to claim 3, wherein the circumference of the first sealing surface is greater than the circumference of the second sealing surface.

9. The face sealing annular valve according to claim 3, wherein the annular valve member is retained by a guide part comprising one or more cylindrically arranged guides, the one or more guides permitting axial motion and restricting radial motion of the annular valve member.

10. The face sealing annular valve according to claim 9, wherein the guide part comprises a cylindrical guide.

11. The face sealing annular valve according to claim 10, wherein the annular valve member comprises a rigid body and sealing members formed of a resilient material, wherein and the majority of the annular valve member does not deform elastically but the sealing members can deform sufficiently under pressure to enable both inner and outer seals to be formed.

12. The face sealing annular valve according to claim 9, wherein the annular valve member is retained around the guide part.

13. The face sealing annular valve according to claim 9, wherein the annular valve member is loosely retained by the guide part.

14. The face sealing annular valve according to claim 12, wherein the annular valve member is sealedly engageable with the cylindrical guide by virtue of a change deformation in a circumference of at least a portion of the annular valve member, when the first and second sealing surfaces are in sealing engagement with the first and second seat-engaging surfaces.

15. The face sealing annular valve according to claim 3, wherein the annular valve member is elastically deformable between the relaxed configuration and the deformed configuration, responsive to a fluid pressure differential.

16. The face sealing annular valve according to claim 3, wherein the annular valve member is resiliently biased towards the annular valve seat by a resilient biasing part.

17. The face sealing annular valve according to claim 16, wherein the annular valve member seat has an axis and inner and outer sealing surfaces of the annular valve are in a plane perpendicular to the axis.

18. A face sealing annular valve for a fluid-working machine, the valve having a valve body and an annular valve seat, the valve seat comprising a first annular sealing surface having a first circumference, a second annular sealing surface having a second circumference which is different from the first circumference, and which is coaxial with the first sealing surface, and at least one aperture between the first and second sealing surfaces providing a fluid pathway through the body of the valve;

and an annular valve member at least part of which is elastically deformable having a first annular seat-engaging surface configured to cooperate with the first annular sealing surface, and a second seat-engaging surface;

wherein the annular valve member has a relaxed configuration in which the first seat-engaging surface is sized to sealedly engage with the first sealing surface and in which the second seat-engaging surface is disposed in relation to the first seat-engaging surface such that the second sealing surface and the second seat-engaging surface do not sealedly engage when the first sealing surface and the first seat-engaging surface are in sealing engagement; and at least part of the annular valve member is elastically deformable to a deformed configuration in which the second sealing surface and the second seat-engaging surface are in sealing engagement while the first sealing surface and the first seat-engaging surface are in sealing engagement, thereby restricting flow of fluid through the fluid pathway, the annular valve member is resiliently biased towards the annular valve seat by a resilient biasing part, and the annular valve member is formed as a steel leaf spring which is curved in cross-section and is sufficiently thin to deform elastically.

19. A face sealing annular valve for a fluid-working machine, the valve having a valve body and an annular valve seat, the valve seat comprising a first annular sealing surface having a first circumference, a second annular sealing surface having a second circumference which is different from the first circumference, and which is coaxial with the first sealing surface, and at least one aperture between the first and second sealing surfaces providing a fluid pathway through the body of the valve;

and an annular valve member at least part of which is elastically deformable having a first annular seat-engaging surface configured to cooperate with the first annular sealing surface, and a second seat-engaging surface;

wherein the annular valve member has a relaxed configuration in which the first seat-engaging surface is sized to sealedly engage with the first sealing surface and in which the second seat-engaging surface is disposed in relation to the first seat-engaging surface such that the second sealing surface and the second seat-engaging surface do not sealedly engage when the first sealing surface and the first seat-engaging surface are in sealing engagement; and at least part of the annular valve member is elastically deformable to a deformed configuration in which the second sealing surface and the second seat-engaging surface are in sealing engagement while the first sealing surface and the first seat-engaging surface are in sealing engagement, thereby restricting flow of fluid through the fluid pathway, the annular valve member is retained around a guide part, the guide part comprises a cylindrical guide, the annular valve member comprises a resilient body and a rigid coating, and the resilient body is elastically deformable to enable the annular valve member to deform between the relaxed configuration and the deformed configuration although the rigid coating does not bend.

20. The face sealing annular valve according to claim 19, wherein the guide part comprises one or more cylindrically arranged guides, the one or more guides permitting axial motion and restricting radial motion of the annular valve member.

* * * * *